(12) United States Patent
Stolyarov et al.

(10) Patent No.: US 10,611,098 B2
(45) Date of Patent: Apr. 7, 2020

(54) FUSED FILAMENT FABRICATION USING MULTI-SEGMENT FILAMENT

(71) Applicant: GRAPHENE 3D LAB INC., Calverton, NY (US)

(72) Inventors: Daniel Stolyarov, Baiting Hollow, NY (US); Elena Polyakova, Baiting Hollow, NY (US)

(73) Assignee: G6 MATERIALS CORP., Ronkonkoma, NY (US)

( * ) Notice: Subject to any disclaimer, the term of this patent is extended or adjusted under 35 U.S.C. 154(b) by 257 days.

(21) Appl. No.: 15/112,098

(22) PCT Filed: Jan. 17, 2015

(86) PCT No.: PCT/US2015/011878
§ 371 (c)(1),
(2) Date: Jul. 15, 2016

(87) PCT Pub. No.: WO2015/156877
PCT Pub. Date: Oct. 15, 2015

(65) Prior Publication Data
US 2016/0339633 A1    Nov. 24, 2016

Related U.S. Application Data

(60) Provisional application No. 61/928,573, filed on Jan. 17, 2014.

(51) Int. Cl.
*B29C 67/00* (2017.01)
*B29C 64/20* (2017.01)
(Continued)

(52) U.S. Cl.
CPC .......... *B29C 67/0055* (2013.01); *B29C 48/02* (2019.02); *B29C 48/05* (2019.02);
(Continued)

(58) Field of Classification Search
CPC ............ B29C 47/0002; B29C 47/0014; B29C 47/0867; B29C 47/92; B29C 47/862;
(Continued)

(56) References Cited

U.S. PATENT DOCUMENTS 2,702,250 A    2/1955  Miller
3,558,411 A *  1/1971  Beelien .................... B44C 3/00
                                                          156/167
(Continued)

FOREIGN PATENT DOCUMENTS

WO    WO1997/037810    10/1997
WO    WO 2011/005492    1/2011
(Continued)

OTHER PUBLICATIONS

Carraher, Charles E., Jr.. (2014). Carraher's Polymer Chemistry (9th Edition)—12.19 Carbon Nanotubes. (pp. 449-455). Taylor & Francis. Retrieved from https://app.knovel.com/hotlink/pdf/id:kt00TTLBOC/carrahers-polymer-chemistry/carbon-nanotubes (Year: 2014).*
(Continued)

*Primary Examiner* — Camie S Thompson
(74) *Attorney, Agent, or Firm* — Mark Malek; Widerman Malek, PL

(57) ABSTRACT

A thermoplastic filament adapted for use in a fused filament fabrication (FFF) printer which has a plurality of segments wherein each pair of adjacent segments is compositionally different and is arranged in a specific order. Also, a method for printing a three-dimensional (3D) article by printing such a filament in a fused filament fabrication (FFF) printer, wherein the fused filament fabrication (FFF) printer carries out a pattern of printing synchronized with the order of the segments in such a filament. Further, a method and device for fabricating such thermoplastic filaments.

26 Claims, 4 Drawing Sheets

(51) Int. Cl.
*B29C 64/106* (2017.01)
*B29C 48/92* (2019.01)
*B29C 48/05* (2019.01)
*B29C 48/02* (2019.01)
*B29C 48/25* (2019.01)
*B29C 48/86* (2019.01)
*B33Y 10/00* (2015.01)
*B33Y 30/00* (2015.01)
*B33Y 70/00* (2020.01)
*B29K 25/00* (2006.01)
*B29L 9/00* (2006.01)

(52) U.S. Cl.
CPC ........ *B29C 48/2665* (2019.02); *B29C 48/865* (2019.02); *B29C 48/92* (2019.02); *B29C 64/106* (2017.08); *B29C 64/20* (2017.08); *B29C 2948/9258* (2019.02); *B29C 2948/92571* (2019.02); *B29K 2023/04* (2013.01); *B29K 2025/08* (2013.01); *B29L 2009/00* (2013.01); *B33Y 10/00* (2014.12); *B33Y 30/00* (2014.12); *B33Y 70/00* (2014.12)

(58) Field of Classification Search
CPC .. B29C 2947/92571; B29C 2947/9258; B29C 48/05; B33Y 10/00; B33Y 70/00; B33Y 30/00; B33Y 80/00; B29K 2023/04; B29K 2025/08; B29K 2071/02; B29K 2105/162; B29K 2105/08; B29K 2077/00; B29K 2079/085; B29L 2009/00; B29L 2031/3425; D06N 7/0028; Y10T 428/24132; Y10T 428/24802; Y10T 428/24942; Y10T 428/24993; Y10T 428/2973; G03B 2299/35134; G03B 2299/49007; C08K 2003/2241; C08J 5/042
USPC ............ 428/364, 114, 195.1, 212, 297, 375; 700/98; 156/304.1, 167, 175
See application file for complete search history.

(56) References Cited

U.S. PATENT DOCUMENTS

| | | | |
|---|---|---|---|
| 3,919,037 A | 11/1975 | Miller | |
| 4,032,382 A | 6/1977 | Obeda | |
| 4,274,707 A | 6/1981 | Pacey et al. | |
| 4,958,905 A | 9/1990 | Tynes et al. | |
| 5,121,329 A | 6/1992 | Crump | |
| 5,518,680 A | 5/1996 | Cima et al. | |
| 6,004,124 A | 12/1999 | Swanson et al. | |
| 6,129,872 A | 10/2000 | Jang | |
| 6,401,002 B1 | 6/2002 | Jang et al. | |
| 6,451,895 B1 | 9/2002 | Topolkareaev et al. | |
| 6,475,663 B1 | 11/2002 | Mohwald et al. | |
| 6,569,373 B2 | 5/2003 | Napadensky | |
| 6,685,866 B2 | 2/2004 | Swanson et al. | |
| 6,782,303 B1 | 8/2004 | Fong | |
| 6,790,403 B1* | 9/2004 | Priedeman, Jr. ........ | B29C 41/36 264/308 |
| 6,923,634 B2 | 8/2005 | Swanson et al. | |
| 7,163,655 B2 | 1/2007 | Weber et al. | |
| 7,169,337 B2 | 1/2007 | Swanson et al. | |
| 7,172,715 B2 | 2/2007 | Swanson et al. | |
| 7,285,506 B2 | 10/2007 | Mardilovich et al. | |
| 7,582,328 B2 | 9/2009 | Rupich et al. | |
| 7,604,470 B2 | 10/2009 | LaBossiere et al. | |
| 7,891,964 B2 | 2/2011 | Skubic et al. | |
| 7,938,351 B2 | 5/2011 | Taatjes et al. | |
| 8,114,375 B2 | 2/2012 | Jang et al. | |
| 8,168,964 B2 | 5/2012 | Hiura et al. | |
| 8,222,190 B2 | 7/2012 | Zharmu et al. | |
| 8,222,321 B2 | 7/2012 | Youm et al. | |
| 8,257,867 B2 | 9/2012 | Liu et al. | |
| 8,287,699 B2 | 10/2012 | Shamu et al. | |
| 8,330,081 B2 | 12/2012 | Dimmick et al. | |
| 8,349,239 B2 | 1/2013 | Hopkins et al. | |
| 8,367,035 B2 | 2/2013 | Rogers et al. | |
| 8,487,296 B2 | 7/2013 | Grebes et al. | |
| 8,551,806 B2 | 10/2013 | Rueckes et al. | |
| 8,557,442 B2 | 10/2013 | Liu et al. | |
| 8,563,169 B2 | 10/2013 | Liu et al. | |
| 8,563,348 B2 | 10/2013 | Harris et al. | |
| 8,587,093 B2 | 11/2013 | Mardilovich et al. | |
| 8,628,167 B2 | 1/2014 | Nomura et al. | |
| 8,665,479 B2 | 3/2014 | Tan et al. | |
| 8,696,938 B2 | 4/2014 | Zhamu et al. | |
| 8,697,485 B2 | 4/2014 | Crain et al. | |
| 8,708,685 B2 | 4/2014 | Hickerson et al. | |
| 8,722,430 B2 | 5/2014 | Odagawa et al. | |
| 8,747,097 B2 | 6/2014 | Pettis | |
| 8,827,684 B1 | 9/2014 | Shumacher et al. | |
| 9,169,968 B2 | 10/2015 | Pettis et al. | |
| 2003/0011103 A1 | 1/2003 | Swanson et al. | |
| 2003/0236588 A1* | 12/2003 | Jang .................... | B82Y 30/00 700/119 |
| 2007/0191526 A1 | 8/2007 | Jordan et al. | |
| 2007/0290410 A1 | 12/2007 | Koo et al. | |
| 2008/0213419 A1 | 9/2008 | Skubic et al. | |
| 2009/0104386 A1 | 4/2009 | Barrera et al. | |
| 2009/0286894 A1 | 11/2009 | Cooper-White | |
| 2010/0170626 A1 | 7/2010 | Lochtman et al. | |
| 2010/0208016 A1 | 8/2010 | Menchik et al. | |
| 2010/0219381 A1 | 9/2010 | Jeschke et al. | |
| 2010/0327479 A1 | 12/2010 | Zinniel et al. | |
| 2011/0037033 A1 | 2/2011 | Green | |
| 2011/0049437 A1 | 3/2011 | Crain et al. | |
| 2011/0076496 A1 | 3/2011 | Batchelder et al. | |
| 2011/0171364 A1 | 7/2011 | Xing et al. | |
| 2011/0260116 A1 | 10/2011 | Plee et al. | |
| 2011/0272646 A1 | 11/2011 | Meyer | |
| 2012/0244333 A1 | 9/2012 | Aksay et al. | |
| 2013/0209600 A1 | 8/2013 | Tow | |
| 2013/0316072 A1 | 11/2013 | Scordilis-Kelley et al. | |
| 2013/0320467 A1 | 12/2013 | Buchanan et al. | |
| 2013/0328228 A1 | 12/2013 | Pettis et al. | |
| 2014/0034214 A1 | 2/2014 | Boyer et al. | |
| 2014/0072833 A1 | 3/2014 | Loganathan et al. | |
| 2014/0134335 A1 | 5/2014 | Pridoehl et al. | |
| 2014/0159273 A1 | 6/2014 | Koop et al. | |
| 2014/0323847 A1 | 10/2014 | McCool | |
| 2015/0056317 A1 | 2/2015 | Chen | |
| 2015/0093465 A1 | 4/2015 | Page | |
| 2015/0158244 A1 | 6/2015 | Tibbits et al. | |
| 2015/0165677 A1 | 6/2015 | Ho et al. | |
| 2015/0231829 A1 | 8/2015 | Haider et al. | |
| 2015/0378654 A1 | 12/2015 | Asai | |
| 2017/0225392 A1 | 8/2017 | Beak | |

FOREIGN PATENT DOCUMENTS

| | | |
|---|---|---|
| WO | WO2013010211 | 1/2013 |
| WO | WO 2014/015994 | 1/2014 |
| WO | WO 2014/039825 | 3/2014 |
| WO | WO 2014/041323 | 3/2014 |
| WO | WO 2014/149312 | 9/2014 |
| WO | WO 2014/210584 | 12/2014 |
| WO | WO 2016/026045 | 2/2016 |
| WO | WO 2016/036607 | 3/2016 |
| WO | WO 2016/140906 | 9/2016 |
| WO | WO 2017/019511 | 2/2017 |

OTHER PUBLICATIONS

International Search Report and Written Opinion of the International Search Authority (dated Jan. 11, 2016) for PCT/US15/047516 12 pages.
International Search Report (ISR) and Written Opinion of the International Search Authority (WOISA) (dated May 6, 2016) for PCT/US16/020031, 13 pages.

(56) References Cited

OTHER PUBLICATIONS

International Search Report (ISR) and Written Opinion of the International Search Authority (WOISA) (dated Nov. 29, 2016) for PCT/US16/043575, 15 pages.
International Search Report and Written Opinion of the International Search Authority (mailed ) for PCT/US15/011878, 10 pages.
International Search Report (ISR) and Written Opinion of the International Search Authority (WOISA) (dated Oct. 24, 2014) for PCT/US14/044768, 14 pages.
Roy-Mayhew, "Functionalized Graphene Sheets in Dye-Sensitized Solar Cell Counter Electrodes," ACS Applied Materials & Interfaces, May 1, 2012 (2013 Dissertation), pp. 1-151.
"Graphene," Wikipedia at: http://en.wikipedia.org/wiki/Graphene, last checked May 15, 2014 (37 pages).
Notice of Transmittal of International Search Report and Written Opinion of International Search Authority (dated Dec. 4, 2015) for PCT/CA/2015050792, 16 pages.
Corrected International Search Report (dated Jan. 29, 2016) for PCT/CA/2015050792, 7 pages.
Written Opinion of International Search Authority (dated Jan. 29, 2016) for PCT/CA/2015050792, 13 pages.
International Preliminary Report of Patentability (dated Dec. 12, 2016) for PCT/CA/2015050792, 40 pages.
Krassenstein, B., Mosaic Manufacturing Reveals Incredible Multi-Colored 3D Printing from a Single Extruder Nov. 14, 2014.
http://3dprint.com/24581/mosaic-manufactuiring-color-3d/, 3 pages.
Sheets 3-4 of Form 1449B/PTO from IDS submitted Oct. 30, 2015 in U.S. Appl. No. 14/831,396, filed Aug. 20, 2015, 2 pages.

* cited by examiner

US 10,611,098 B2

FUSED FILAMENT FABRICATION USING MULTI-SEGMENT FILAMENT

CROSS-REFERENCE TO RELATED APPLICATIONS

This application is a national stage application of PCT Application Serial Number PCT/US15/011878, filed Jan. 17, 2015, which makes reference to and claims the priority benefit of U.S. Provisional Patent Application No. 61/928,573, filed Jan. 17, 2014, entitled "Fused Filament Fabrication with Multi-Material Filament," the entire disclosure and contents of which is hereby incorporated by reference in its entirety.

FIELD OF THE INVENTION

The present invention relates to thermoplastic filament adapted for use in a fused filament fabrication (FFF) printer which has a plurality of segments wherein each pair of adjacent segments having at least one different feature and is arranged in a specific order. The present invention also relates to a method for creating a three-dimensional (3D) article by printing such a thermoplastic filament in a fused filament fabrication (FFF) printer, wherein the fused filament fabrication (FFF) printer carries out a pattern of printing synchronized with the order of the segments in such a filament. The present invention further relates to a method and device for fabricating such thermoplastic filaments.

BACKGROUND

Additive manufacturing (also commonly referred to as three-dimensional (3D) printing) may create physical objects, structures, etc., based upon a computer-controlled program which instructs the 3D printer how to deposit successive layers of extruded material which may then fuse together to form the printed article, device, component, object, structure, part, etc. Fused deposition modeling (FDM), also referred to herein as fused filament fabrication (FFF), is one such additive manufacturing process. In fused filament fabrication (FFF), a thermoplastic filament may be supplied from a coil of such filament to an extrusion nozzle. In many FFF machines, a worm-drive gear system engages and pushes the filament into and through the nozzle at a controlled rate. The nozzle may be heated to melt the filament with the melted filament then being deposited by an extrusion head as beads of material which may then rapidly harden after extrusion from the nozzle.

While depositing the melted filament, the nozzle may be moved in both horizontal and vertical directions by a numerically (e.g., computer) controlled mechanism. For example, the positioning of the nozzle may follow a build path controlled by a computer-aided manufacturing (CAM) software program. The build path defines the pattern for how the melted filament is deposited from the extrusion head as "road(s)" of material to form a given layer. Accordingly, in FFF additive manufacturing, the article, device, component, object, structure, part, etc., to be produced is thus built from the bottom up, layer by layer.

SUMMARY

In a first broad aspect of the present invention, there is provided an article comprising a thermoplastic filament adapted for a fused filament fabrication (FFF) printer, the filament comprising:
a plurality of segments, each of the segments comprising a thermoplastic polymer;
each pair of adjacent segments having at least one different feature;
wherein the segments are arranged in a specified order in the filament to provide a synchronized pattern of printing when the filament is printed with a fused filament fabrication (FFF) printer.

In a second broad aspect of the present invention, there is provided a method for printing a three-dimensional (3D) article, which comprises the following steps of:
(a) providing a thermoplastic filament adapted for a fused filament fabrication (FFF) printer, the filament comprising:
a plurality of segments, each of the segments comprising a thermoplastic polymer;
each pair of adjacent segments having at least one different feature;
wherein the segments are arranged in a specified order in the filament; and
(b) printing the filament of step (a) with a fused filament fabrication (FFF) printer to form the three-dimensional (3D) article, wherein the fused filament fabrication (FFF) printer carries out a pattern of printing synchronized with the order of the segments in the filament.

In a third broad aspect of the present invention, there is provided a method for preparing a thermoplastic filament adapted for a fused filament fabrication (FFF) printer, which comprises the following steps of:
(a) providing a plurality of segments, each of the segments comprising a thermoplastic polymer and having a pair of spaced apart ends, the segments being arranged in a specified order such that adjacent segments have at least one different feature; and
(b) joining the ends of the adjacent segments of step (a) to form a thermoplastic filament having a plurality of segments which provides a synchronized pattern of printing when the filament is printed with a fused filament fabrication (FFF) printer.

In a fourth broad aspect of the present invention, there is provided a device for fabricating a continuous thermoplastic filament having a plurality of segments, which comprises:
a first filament supply component for supplying a first thermoplastic filament;
a second filament supply component for supplying a second thermoplastic filament;
a filament cutting component for cutting each of the first and second filaments into segments, each of the segments having a forward end and trailing end spaced apart from the forward end;
a first filament guide component for guiding the first filament into position to be cut by the filament cutting component;
a second filament guide component for guiding the second filament into position to be cut by the filament cutting component;
a filament segment joining section positioned after the filament cutting component, the filament joining section having:
a chamber for guiding and aligning the forward end of one segment of the first and second filaments into contact with the trailing end of the other segment of the first and second filaments; and
a heater element for heating and joining the trailing end to the forward end when in contact to form a continuous thermoplastic filament having a plurality of segments;

wherein the first and second filament guide components are movable so as to alternatively and sequentially permit the first and second filaments to be cut by the filament cutting component.

BRIEF DESCRIPTION OF THE DRAWINGS

The invention will be described in conjunction with the accompanying drawings, in which.

DETAILED DESCRIPTION

Figure 1:
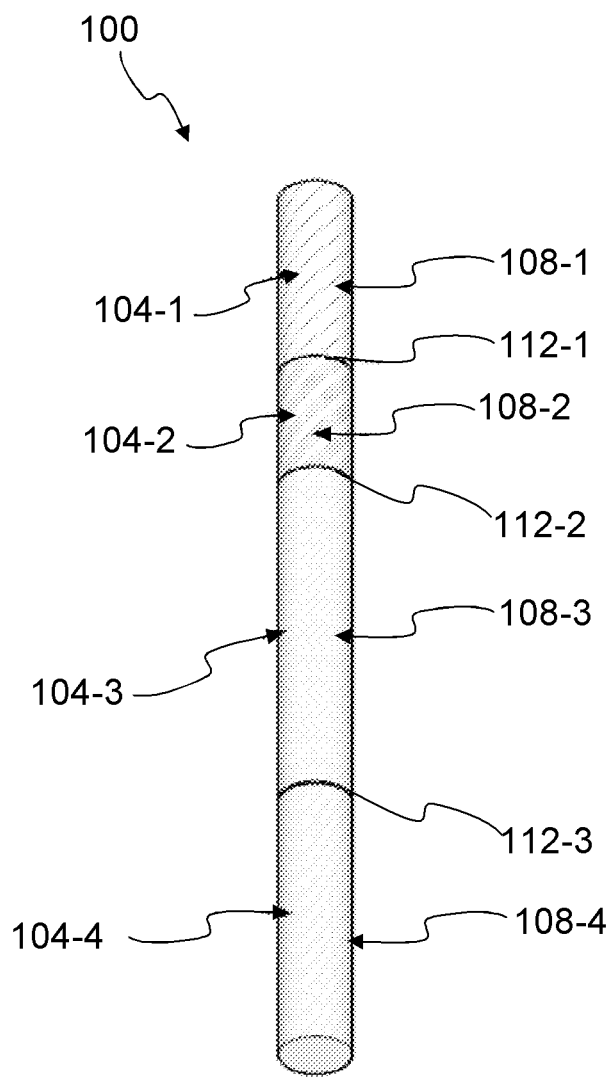
FIG. 1 is a perspective view illustrating an embodiment of a thermoplastic filament of the present invention.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "outer," "inner," "upper," "lower," "top," "bottom," "side," "front," "frontal," "forward," "rear," "rearward," "back," "trailing," "above," "below," "left," "right," "horizontal," "vertical," "upward," "downward," etc. are merely used for convenience in describing the various embodiments of the present invention. For example, the embodiments of the present invention illustrated in FIGS. 1 through 4 may be oriented in various ways.

For the purposes of the present invention, the term "thermoplastic" refers to the conventional meaning of thermoplastic, i.e., a composition, compound, material, etc., that exhibits the property of a material, such as a high polymer, that softens or melts so as to become pliable, malleable, etc., when exposed to sufficient heat and generally returns to its original condition when cooled to room temperature.

For the purposes of the present invention, the term "filament" refers to a continuous length of material which has a thread-like structure, i.e., having a length which greatly exceeds its diameter, and which may be used with fused filament fabrication (FFF) printer. A filament may be solid or may be fluid, i.e., when liquefied, molten, melted, softened, etc.

For the purposes of the present invention, the term "segment" refers to a section, portion, region, etc., of a filament which has at least one feature which is different from an adjacent section, portion, region, etc., of the filament For the purposes of the present invention, the term "adjacent segment" refers to a pair of segments in a filament which are next to each other, and which, when joined, connected, fused, spliced, adhered, etc., together, share a common end, boundary, edge, etc.

For the purposes of the present invention, the term "different feature" with respect to adjacent segments of a filament refers to differences in one or more of: the composition of the adjacent segments; the appearance of the adjacent segments; the functional properties of the adjacent segments, etc. Differences in composition may include one or more of: different materials, compounds, substances, etc., present in the adjacent segments; different amounts of the same materials, compounds, substances, etc., present in the adjacent segments, etc. Differences in appearance may include one or more of: differences in color, shape, opacity, transparency, translucency, fluorescence, etc., of the adjacent segments. Differences in functional properties may include one or more of: differences in physical, structural, mechanical, chemical, electrical, etc., properties of the adjacent segments, such as, for example, differences in electrical conductivity, thermal conductivity, mechanical strength, viscoelasticity, solubility, magnetic susceptibility, etc.;

For the purposes of the present invention, the term "polymer" refers to those polymers which are thermoplastic. Suitable thermoplastic polymers for use herein may include, for example, one or more of: acrylate or methylmethacrylate polymers or copolymers, such as polyacrylates, polymethylmethacrylates, etc.; polylactic acid (PLA) polymers; polyhydroxyalkanoate (PHA) polymers, such as polyhydroxybutyrate (PHB); polycaprolactone (PCL) polymers; polyglycolic acid polymers; acrylonitrile-butadiene-styrene polymers (ABS); polyvinylidene fluoride polymers, polyurethane polymers, polyolefin polymers (e.g., polyethylene, polypropylene, etc.), polyester polymers, polyalkylene oxide polymers, such as polyethylene oxide (PEO), polyvinyl alcohol (PVA) polymers, polyamide polymers, polycarbonate polymers, high impact polystyrene (HIPS) polymers, polyurethane polymers, etc. These polymers may be used in pure form or as a blend with each other or other additives such as plasticizers, fillers, solvents, colorants, etc., may be water-soluble (e.g., water-soluble polyethylene oxide (PEO) polymers), etc.

For the purposes of the present invention, the term "polymer matrix" refers to a matrix which provides the external or continuous (bulk) phase in which may be dispersed one or more other compounds, materials, substances, etc., and which, besides the dispersed one or more other compounds materials, substances, etc., may comprise one or more polymers, as well as one or more other optional additives, such as fillers, plasticizers, solvents, colorants, etc.

For the purposes of the present invention, the term "carbon material" material refers to materials made of carbon. Carbon materials may include one or more of: graphite; graphite flakes; carbon black; graphene; graphene-like materials; (e.g., reduced graphene oxide, functionalized graphene, graphene oxide, partially reduced graphene oxide, etc.); carbon-based nanofibers; carbon-based nanotubes; etc.

For the purposes of the present invention, the term "graphene-like material" refers to a material, substance, etc., which may have a layered structure the same or similar to graphene. Graphene-like materials may include one or more of: graphene; functionalized graphene; graphene oxide; partially reduced graphene oxide; graphite flakes; molybdenum disulfide ($MoS_2$); molybdenum diselenide ($MoSe_2$); molybdenum ditelluride ($MoTe_2$); tungsten disulfide ($WS_2$); tungsten diselenide ($WSe_2$); hexagonal boron nitride (h-BN); gallium sulfide (GaS); gallium selenide (GaSe); lanthanum cuprate ($La_2CuO_4$); bismuth tritelluride ($Bi_2Te_3$); bismuth triselenide ($Bi_2Se_3$); antimony triselenide ($Sb_2Se_3$); zinc oxide (ZnO); niobium disulfide ($NbS_2$); niobium diselenide ($NbSe_2$); tantalum disulfide ($TaS_2$); vanadium disulfide ($VS_2$); rhenium disulfide ($ReS_2$); rhenium diselenide ($ReSe_2$); titanium disulfide ($TS_2$); titanium diselenide (TSe$_2$); indium trisulfide (InS$_3$); zirconium disulfide (ZrS$_2$); zirconium diselenide (ZrS$_2$); cadmium selenide (CdSe); etc.

For the purposes of the present invention, the term "graphene" refers to pure or relatively pure carbon in the form of a relatively thin, nearly transparent sheet, which is one atom in thickness (i.e., a monolayer sheet of carbon), or comprising multiple layers (multilayer carbon sheets), having a plurality of interconnected hexagonal cells of carbon atoms which form a honeycomb like crystalline lattice structure. In addition to hexagonal cells, pentagonal and heptagonal cells (defects), versus hexagonal cells, may also be present in this crystal lattice.

For the purposes of the present invention, the term "functionalized graphene" refers to graphene which has incorporated into the graphene lattice a variety chemical functional groups such as —OH, —COOH, NH$_2$, etc., in order to modify the properties of graphene.

For the purposes of the present invention, the term "graphene oxide" (also known as "graphitic acid" and "graphite oxide") refers interchangeably to a compound of carbon, oxygen, and hydrogen which may exist in variable ratios of these three atoms, and which may be obtained by treating graphite with strong oxidizers.

For the purposes of the present invention, the term "partially reduced graphene oxide" refers to graphene oxide that, upon reduction, contains from about 5 about 30% oxygen by weight of the graphene oxide.

For the purposes of the present invention, the terms "graphene platelets" and "graphene sheets" refer interchangeably to platelets of graphene comprising one or more layers of a two-dimensional (2D) graphene plane, and may also refer to platelets and sheets comprised of graphene oxide, partially reduced graphene oxide, functionalized graphene, etc.

For the purposes of the present invention, the term "graphene nanoplatelets (NGPs)" and "nanosheets" refer interchangeably to platelets of graphene, and may also refer to platelets and sheets comprised of graphene oxide, partially reduced graphene oxide, functionalized graphene, etc., having a thickness in the range of from about 0.34 to about 100 nm.

For the purposes of the present invention, the term "graphene-like nanoplatelets" refers to graphene-like materials having platelet characteristics the same or similar to graphene nanoplatelets (NGPs).

For the purposes of the present invention, the term "flakes" refers to particles in which two of the dimensions (i.e., width and length) are significantly greater compared to the third dimension (i.e., thickness).

For the purposes of the present invention, the term "nanoscopic" refers to materials, substances, structures, etc., having a size in at least one dimension (e.g., thickness) of from about 1 to about 1000 nanometers, such as from about 1 to about 100 nanometers. Nanoscopic materials, substances, structures, etc., may include, for example, nanoplatelets, nanotubes, nanowhiskers, etc.

For the purposes of the present invention, the term "quantum dot" refers to a nanocrystal made from graphene or graphene-like materials which are small enough to exhibit quantum mechanical properties.

For the purposes of the present invention, the term "liquid" refers to a non-gaseous fluid composition, compound, substance, material, etc., which may be readily flowable at the temperature of use (e.g., room temperature) with little or no tendency to disperse and with a relatively high compressibility.

For the purposes of the present invention, the term "room temperature" refers to refers to the commonly accepted meaning of room temperature, i.e., an ambient temperature of from about 20° to about 25° C.

For the purposes of the present invention, the term "extrudable" refers to composition, compound, substance, material, etc., which is sufficiently malleable, pliable, thermoplastic, etc., such that it may be forced through an extrusion orifice or die.

For the purposes of the present invention, the term "fusible" refers to a thermoplastic composition, substance, material, etc., which may be fused, sintered, joined together, combined, etc., by the application of heat.

For the purposes of the present invention, the term "three-dimensional (3D) printable material" refers to a thermoplastic composition, substance, material, etc., which may be formed into a three-dimensional (3D) article, device, component, object, structure, part, etc., by a three-dimensional (3D) printing technique For the purposes of the present invention, the term "three-dimensional (3D) printing" (also known as "additive printing" and "additive manufacturing") refers to any of various processes, techniques, etc. (e.g., coating, spraying, depositing, applying, extruding, fusing, sintering, etc., or any combination thereof) for making a three-dimensional (3D) article, device, object, component structure, part, etc., from a three-dimensional (3D) model, other electronic data source (e.g., computer assisted drawing (CAD) program file, stereolithographic (STL) file, etc.), etc., through additive processes in which successive layers of material (e.g., filaments, films, powders, particles, pellets, etc.) may be laid down, for example, under computer control. Three-dimensional (3D) printing processes, techniques, etc., may include, for example, fused filament fabrication (FFF), selective laser sintering (SLS) (also referred to herein interchangeably as selective laser melting (SLM)), inkjet head 3D printing (also referred to herein interchangeably as inkjet 3D printing), etc.

For the purposes of the present invention, the term "fused filament fabrication (FFF) (also referred to herein interchangeably as fused deposition modeling (FDM), fused extrusion deposition (FED), or Plastic Jet Printing (PJP))" refers to a three-dimensional (3D) printing technique wherein a thermoplastic filament (preformed or formed in situ) is extruded from an extrusion (printing) nozzle (also referred to interchangeably as a "printing head") in layers which, due to being liquefied, molten, softened, melted, etc., adhere (fuse) together to form the three-dimensional (3D) article, device, component, object, structure, part, etc.

For the purposes of the present invention, the term "fused filament fabrication (FFF) printer" refers to any three-dimensional (3D) printer which operates by using a fused filament fabrication (FFF) technique.

For the purposes of the present invention, the term "road" refers to a continuous length of liquefied, molten, melted or softened material which is laid down after extrusion of the thermoplastic filament from a fused filament fabrication (FFF) printer.

For the purposes of the present invention, the term "colorants" refers to additive compositions, compounds, substances, materials, etc., such as pigments, tints, etc., which impart color to a filament or a segment of a filament.

For the purposes of the present invention, the term "fillers" refers to additives which may alter a composition's mechanical properties, physical properties, chemical properties, appearance, etc, and which may include, for example, one or more of: magnesium oxide, hydrous magnesium silicate, aluminum oxides, silicon oxides, titanium oxides, calcium carbonate, clay, chalk, boron nitride, limestone, diatomaceous earth, mica, glass quartz, ceramic and/or glass microbeads, metal or metal oxide fibers and particles, Magnetite®, magnetic iron(III) oxide, carbon nanotubes and/or fibers, wood, cements, adhesives, gems, decorative elements, etc.

For the purposes of the present invention, "plasticizer" refers to the conventional meaning of this term as an additive which, for example, softens, makes more flexible, malleable, pliable, plastic, etc., a polymer, thus providing flexibility, pliability, durability, etc., which may also decrease the melting and the glass transition temperature of the polymer, and which may include, for example, one or more of: tributyl citrate, acetyl tributyl citrate, diethyl phthalate, glycerol triacetate, glycerol tripropionate, triethyl citrate, acetyl triethyl citrate, phosphate esters (e.g., triphenyl phosphate, resorcinol bis(diphenyl phosphate), olicomeric phosphate, etc.), long chain fatty acid esters, aromatic sulfonamides, hydrocarbon processing oil, propylene glycol, epoxy-functionalized propylene glycol, polyethylene glycol, polypropylene glycol, partial fatty acid ester (Loxiol GMS 95), glucose monoester (Dehydrat VPA 1726), epoxidized soybean oil, acetylated coconut oil, linseed oil, epoxidized linseed oil, etc.

For the purposes of the present invention, the term "solvent" refers to a liquid which may dissolve or suspend another material which may be a solid, gas, or liquid. Suitable for use as additives may include one or more of: water, acetone, chloroform, dichloromethane, etc.

For the purposes of the present invention, the term "blend," "blending," and similar words and/or phrases refers to combining, mixing together, unifying, etc., a plurality of components, compounds, compositions, substances, materials, etc.

For the purposes of the present invention, the term "substantially uniform" refers to a dispersion, material, substance, etc., which is substantially uniform in terms of composition, texture, characteristics, properties, etc.

For the purposes of the present invention, the term "heat sink refers to a passive heat exchanger which cools a device by dissipating heat into the surrounding medium and which may be capable of efficient transfer and dissipation of heat produced by other components (e.g., electronic, etc.).

For the purposes of the present invention, the term "3D current conductors" refers to three-dimensional (3D) structures designed to conduct electrical current.

For the purposes of the present invention, the term "solar cell grid collectors" refers to the part of the solar cell, such as is made of metal or other conductive material, and which collects charges generated in/by semiconductor part of a solar cell.

For the purposes of the present invention, the term "smart labels" refers to radiofrequency identification (RFID) labels which, for example, may be embedded as inlays inside label material, and then, for example, printing bar code and/or other visible information on the surface of the label.

For the purposes of the present invention, the term "radiofrequency identification (RFID) tags" refers to tags attached to objects that contain electronically stored information, and which, through use of radiofrequency electromagnetic fields, permit automatic identifying and tracking of such tags.

For the purposes of the present invention, the term "electromagnetic interference (EMI) shielding" refers to shielding against electromagnetic disturbances, such as radiofrequency interference.

For the purposes of the present invention, the term "comprising" means various compounds, components, ingredients, substances, materials, layers, steps, etc., may be conjointly employed in embodiments of the present invention. Accordingly, the term "comprising" encompasses the more restrictive terms "consisting essentially of" and "consisting of."

For the purposes of the present invention, the terms "a" and "an" and similar phrases are to be interpreted as "at least one" and "one or more." References to "an" embodiment in this disclosure are not necessarily to the same embodiment.

For the purposes of the present invention, the term "and/or" means that one or more of the various compositions, compounds, ingredients, components, elements, capabilities, steps, etc., may be employed in embodiments of the present invention.

DESCRIPTION

One of the potential limitations of fused filament fabrication (FFF) printing is having the fused filament fabrication (FFF) printer incorporate different materials into the article, device, component, object, structure, part, etc., being printed. For example, the body of the article, device, component, object, structure, part, etc., being created may have a body comprising a thermoplastic polymer matrix in which is embedded functional components such electronic circuitry. But many fused filament fabrication (FFF) printers have only one printing nozzle and thus may be limited to laying down a "road" of material comprising single, uniform composition. One alternative technique integrating such conductive or other functioning regions, portions, sections, etc., into three-dimensional (3D) printed articles, devices, components, objects, structures, parts, etc., is to combine three-dimensional (3D) printing, such as fused filament fabrication (FFF) printing, with direct two-dimensional (2D) printing. One such example is to used a heated syringe which disperses conductive traces of a conductive material over the three-dimensionally (3D) printed component. Alternatively, conductive spray-on coatings may be applied to the three-dimensionally (3D) printed component. But these combined methods are still confined to printing three-dimensional (2D) electronics within the three-dimensional (3D) component, and may not be applicable to embedding such electronics into the three-dimensional (3D) article, device, component, object, structure, part, etc.

To permit printing with more than one material, fused filament fabrication (FFF) printers may be provided with more than one printing nozzle, with each nozzle being able to print filaments which comprise different materials. For example, U.S. Pat. No. 8,827,684 (Schumacher et al.), issued Sep. 9, 2014 discloses a fused filament fabrication (FFF) printer provided with a print head unit which may have four print heads (printer nozzles) which share a common heating block and heating block temperature sensor(s). Each print head is provided with a separate thermoplastic filament which is controlled and driven to the print tip. Accordingly, the print heads may print different materials, e.g., materials having different colors, to provide the printed article, device, component, object, structure, part, etc. For example, when multiple colors are used, all colors may be printed to fill the interior of the printed article, device, component, object, structure, part, etc, while particular colors may be printed to color the exterior surface of the article, device, component, object, structure, part, etc. But such specialized multi-nozzle fused filament fabrication (FFF)

printers may be quite costly, as well as being so large and bulky as to not be sufficiently portable.

In embodiments of the present invention, the thermoplastic filaments are provided with adjacent portions, regions, sections, etc. (i.e., hereafter referred to as "segments") of the filament which include differing features (e.g., differing material compositions) so that that the filament may be engineered and adapted for use in a fused filament fabrication (FFF) printer, even and especially if that FFF printer has only one printing nozzle, as well as to allow and allow printing of an article comprising several materials which are different from each other. These thermoplastic filaments comprise a plurality of segments, each segment comprising at least thermoplastic polymer, but which may also comprise other materials which may be substantially uniformly dispersed in the thermoplastic polymer matrix. In other words, each pair of adjacent segments of the filament have at least one different feature in terms of composition, appearance, functional properties, etc. For example, these differences in features may include one or more of following: (1) different structural materials, sacrificial (removable) materials, etc.; (2) materials of different color (e.g., different colorants), including materials which are different in terms of opaqueness, transparency, translucency, fluorescence, etc.; (3) different additives, e.g., fillers, plasticizers, solvents, etc., including different types and amounts of such additives; (4) materials having different functional properties, e.g., electrically conductive materials, semiconductive materials, insulating materials, etc., such as electroactive polymers, piezoelectric materials, etc.; (5) materials having different mechanical and physical properties, such as in terms of modulus, viscoelasticity, plasticity; magneticity, etc.; (6) materials, such as quantum dots, with impart different optical or spectroscopic properties, including different refractive indices, fluorescence properties, etc.; (7) materials which are different in being infused with, having incorporated therein, etc., other two-dimensional (2D) materials such as graphene nanoplatelets, carbon or/and inorganic nanotubes, flakes of graphene-like materials such as molybdenum and tungsten disulfides flakes, boron nitride flakes, carbon black, carbon fibers, fullerenes, etc.; (8) materials having different thermal stability, chemical stability or solubility; (9) materials having different thermal conductivity; (10) materials having higher and lower atomic numbers (i.e., different Z numbers), higher or lower molecular weights, etc.; (11) materials with different permeability for gases, ions, liquids, etc.; etc. Segments of embodiments of the thermoplastic filaments according to the present invention may have similar or differing lengths, may have physical properties which change gradually or abruptly along or throughout the entire length of the filament, etc.

In addition, these segments are arranged in a specified order in the thermoplastic filament to provide a synchronized pattern of printing when the filament is printed with a fused filament fabrication (FFF) printer. In other words, embodiments of the thermoplastic filaments of the present invention are created with segments in a predetermined order such that, when printed with a fused filament fabrication (FFF) printer, the fused filament fabrication (FFF) printer lays down a "road(s)" of the material in a synchronized pattern that, upon completion of the printing, provides the printed three-dimensional (3D) article, device, component, object, structure, part, etc., which may have different colors throughout, may have embedded functionality, such as electrical circuitry, heat sinks, sensors, other electronics, etc. Embodiments of the thermoplastic filaments according the present invention thus provide significant processing flexibility, even with fused filament fabrication (FFF) printers having a single printing nozzle.

Besides processing flexibility, these thermoplastic filaments may also provide a significantly enhanced ability to create reproducible numbers of the same printed article, device, component, object, structure, part, etc., due to consistent fabrication of the thermoplastic filament, or to vary the features of the printed article, device, component, object, structure, part, etc., by simply altering the composition of one or more segments and the order those segments are arranged in, while still using the same fused filament fabrication (FFF) printer by simply altering the programming (e.g., a computer program file, such as computer assisted drawing (CAD) program file, stereolithographic (STL) file, etc.) controlling that printer to be synchronized with the varied segments, order of segments, etc., of thermoplastic filament. Some of the embodiments of these thermoplastic filaments may allow for the production of three-dimensional (3D) printed fully or partially-integrated circuitry. The flexibility and variability of the embodiments of the thermoplastic filaments of the present invention may create a compact fused filament fabrication (FFF) printer system which may print out a complete working devices, such as power sources, electronics, actuators, sensors, and mechanical components, biological materials, etc., in any geometry, shape, size, configuration, interconnection, etc., desired.

An example of an embodiment of thermoplastic filament according to the present invention (hereafter referred to for convenience only as "thermoplastic multi-segment filament") which may be used with a fused filament fabrication (FFF) printer having a single printing nozzle is illustrated in FIG. 1 and indicated as 100. As shown in FIG. 1, filament 100 comprises a plurality of segments, of which four are shown and are indicated as 104-1, 104-2, 104-3, and 104-4. Each of segments 104-1, 104-2, 104-3, and 104-4 may have different features in terms of composition, appearance, functional properties, etc., e.g., each of these four segments may be comprised of different materials, or only each pair of adjacent segments may be comprised of different materials. For example, segments 104-1 and 104-3 may be comprised of the same material(s) (e.g., the same colorant, the same functional material, etc.), while segments 104-2 and 104-4 may be comprised of the same material(s) but which is different from the material(s) of which segments 104-1 and 104-3 are comprised (e.g., a different colorant, a different functional material, only thermoplastic polymer, with or without other additives such as filler, plasticizers, solvents, etc.). As shown with respect to segment 104-2, each segment has a body portion indicated, respectively, as 108-1, 108-2, 108-3, and 108-4, as well as respective ends, boundaries, edges, etc., indicated respectively as 112-1, 112-2, and 112-3 which define where adjacent segments begin and end. For example, 112-1 defines the end/boundary between adjacent segments 104-1/104-2, 112-2 defines the end/boundary between adjacent segments 104-2/104-3, and 112-3 defines the end/boundary between adjacent segments 104-3/104-4. As also illustrated in FIG. 1, segments 104-1, 104-2, 104-3, and 104-4 may have different lengths or the same length, the particular length of each segment being dictated by the materials present in that segment, wherein the pattern of lay down of "roads" of material by the filament fabrication (FFF) printer is determined by where that segment is to be present in filament 100.

In some embodiments of the thermoplastic multi-segment filaments of the present invention, one of the adjacent segments comprises a polymer matrix without functional materials being present (e.g., to form the body, case, container, etc., of the printed three-dimensional (3D) article, device, component, object, structure, part, etc.), while the other of the adjacent segments comprises a polymer matrix with functional materials being present. For example, filament segments 101-1 and 101-3 may comprise a polymer matrix without functional materials being present, while filament segments 101-2 and 101-4 comprise a polymer matrix but with functional materials being present (e.g., two-dimensional (2D) materials such as graphene nanoplatelets, carbon or/and inorganic nanotubes, flakes of graphene-like materials such as molybdenum and tungsten disulfides flakes, boron nitride flakes, carbon black, carbon fibers, fullerenes, etc.). In other embodiments of the thermoplastic multi-segment filaments of the present invention, one of the adjacent segments may comprise a polymer matrix with structural materials being present (e.g., carbon fibers, etc.), while the other of the adjacent segments comprises a polymer matrix with functional materials being present which may form electronics, such as electronic circuitry (e.g., graphene nanoplatelets, carbon or/and inorganic nanotubes flakes of graphene-like materials such as molybdenum and tungsten disulfides flakes, boron nitride flakes, carbon black, carbon fibers, fullerenes, etc.)

FFF Printing with FFF Printer Having Single Printer Head

Figure 2:
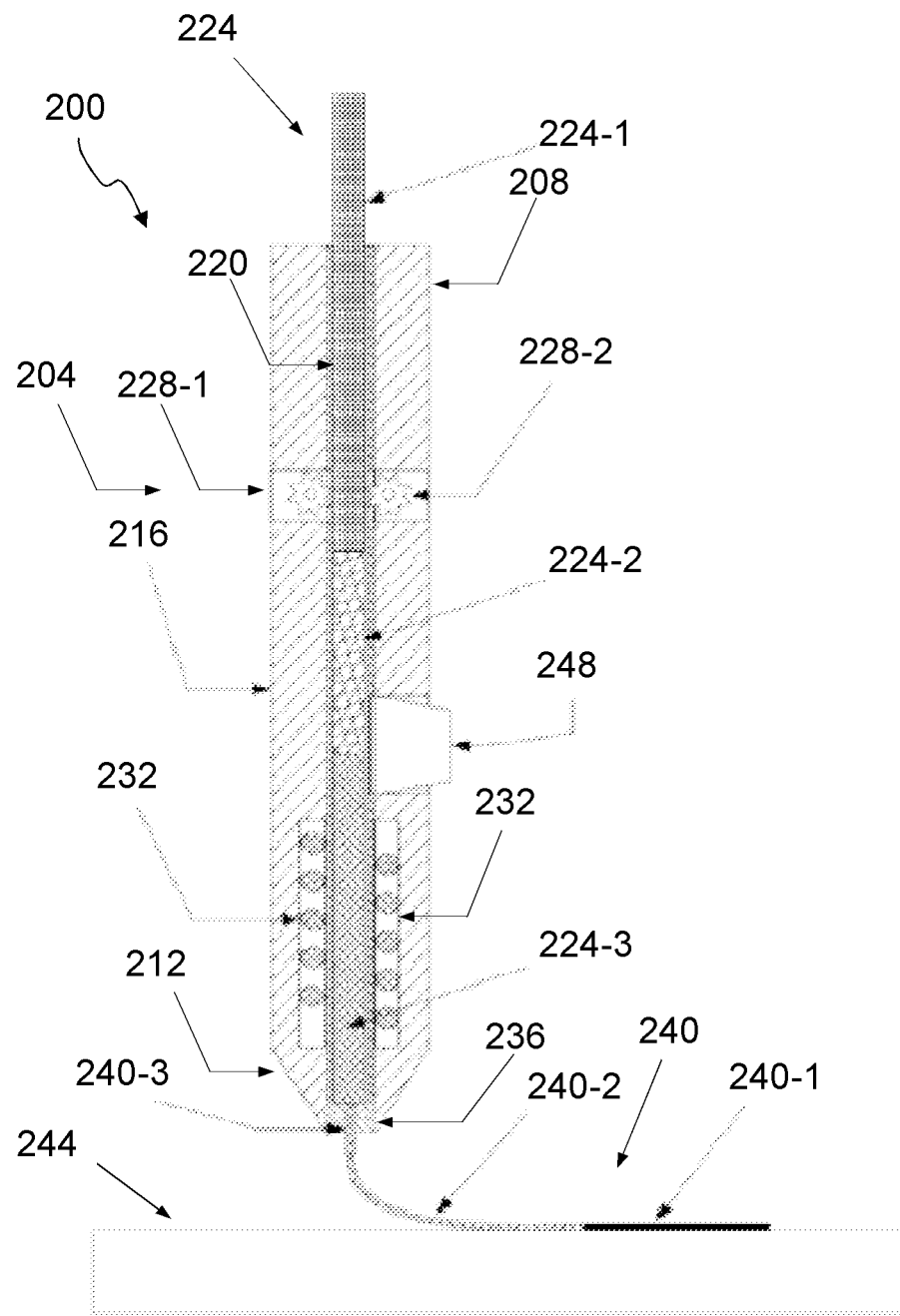
FIG. 2 is a side-sectional view illustrating an embodiment of fused filament fabrication (FFF) printing according to the present invention with a thermoplastic filament such as shown in FIG. 1.

Embodiments of the thermoplastic multi-segment filaments of the present invention permit fused filament fabrication (FFF) printing of adjacent filament segments comprising different materials, even with fused filament fabrication (FFF) printers having a single printing head (i.e., printing nozzle), as illustrated in FIG. 2. Referring to FIG. 2, the fused filament fabrication (FFF) printer is indicated generally as 200. Printer 200 includes a printing nozzle, indicated generally as 204, which may be moved horizontally back and forth and side-to-side (i.e., in the X and Y directions), as well as vertically up and down (i.e., in the Z direction), and which has an upper filament entry end, indicated as 208, a lower extrusion orifice end, indicated as 212, and a main body portion, indicated as 216. Printing nozzle 204 has a generally cylindrically-shaped extrusion chamber, indicated as 220, for receiving the filament (e.g., such as filament 100 illustrated in FIG. 1), indicated as 224, and which extends from upper end 208 to lower end 212. Provided in main body portion 216 is a pair of gears, indicated as 228-1 and 228-2 which engage and advance filament 224 towards lower end 212. Filament 224 is shown as comprising a segment, indicated as 224-1 which is shown entering extrusion chamber 220 at upper end 208, an adjacent segment, indicated as 224-2, and a segment, indicated as 224-3 adjacent segment 224-3 which is being extruded by printing nozzle 204. Also provided in main body portion 216 near lower end 208 is a heater element (liquefier), indicated as 232, which heats and liquefies (softens) segment 224-3 of filament 224 so that segment 224-3 may be extruded through the extrusion orifice (die), indicated as 236. The liquefied, softened segment 224-3 is shown FIG. 2 as being extruded through extrusion orifice to form a "road" of material, indicated as 240, which is deposited on a printing bed, indicated as 244. The deposited "road" of material 240 includes two segments, indicated as 240-1 and 240-2, as well as a portion of segment 224-3, indicated as 240-3, which is currently exiting though extrusion orifice 236 and is about to be deposited on printing bed 244.

As shown in FIG. 2, main body portion 216 of printing nozzle 204 may also be equipped with a sensor, indicated as 248. Sensor 248 may be used to read and recognize the indicia (e.g., markings, bar codes, etc.) on filament 224 which may provide information, data, etc., as to characteristics of filament 224, including what the composition is (i.e., what materials are present) in each of segment 224-1 through 224-3 of filament 224, identifying the ends/boundaries of each of segment 224-1 through 224-3, what temperature, filament throughput rate, etc., may be required for operating liquefier 232 and gears 228-1/228-2, etc. Such indicia may be present on the starting segment (i.e., segment 240-1) only of filament 224, may be present at various points along filament 224, etc.

As illustrated in FIG. 2, filament 224 may be pre-formed (e.g., like filament 100 of FIG. 1) before being supplied to extrusion chamber 220. In other embodiments, filament 224 may be formed, for example, in another extruder positioned in before printer 200 which then supplies the formed filament 224 to extrusion chamber 220. When another extruder is used, portions of material(s) corresponding to each segment of filament 224 may be supplied to the extruder in the appropriate (specified) order that the segment will appear in the finished filament 224. This extruder then forms filament 224 with the plurality of segments in the specified order which may be permitted to solidify before being supplied into extrusion chamber 220, or which may be supplied to extrusion chamber 220 prior to complete solidification of filament 224 as long as printing nozzle 204 may extrude the partially solidified filament through extrusion orifice 236 to form "road" of material 240.

In some embodiments of the method of the present invention, the fused filament fabrication (FFF) printer, such as printer 200 illustrated in FIG. 2, may be operate in what is hereafter referred to as a "passive printing" mode. In a "passive printing" mode, the composition, length, order, etc., of the segments of filament 224 required to print the article, device, component, object, structure, part, etc., are predetermined (e.g., filament 224 is already fabricated according to instructions from a computer program file such as, a computer assisted drawing (CAD) program file, stereolithographic (STL) file, etc., which describes, for example, the composition, order, length and/or starting/end point, etc., of each of the plurality of segments in filament 224, the computer program file being generated by a computer program based upon the structure of the article, device, component, object, structure, part, etc., to be printed by printer 200) in filament 224. Filament 224 is then supplied to printer 200 with printing nozzle 204 automatically printing the article, device, component, object, structure, part, etc., according to preset operating conditions in terms of temperature, throughput rate, etc., the lay down pattern from the printing nozzle 204, etc. In other words, in a "passive printing" mode, printer 200 operates essentially in a preset manner, other than sensor 248 determining the forward end of filament 224 is within extrusion chamber 220 and reading any indicia (e.g., marks) present on filament 224 which indicate the temperature conditions for operating printing nozzle 204. In other words, filament 224 may be loaded into extrusion chamber 220 with printing nozzle 204 moving along in a predetermined path and pattern to lay down the "road" of material 240 to print the article, device, component, object, structure, part, etc. For example, the "road" of material 240 may be laid down in a continuous spiral pattern, in a continuous sinuous "snake-like" back and forth pattern, in a back and forth pattern that lays down a discontinuous series of "roads" of material, etc.

Figure 3:
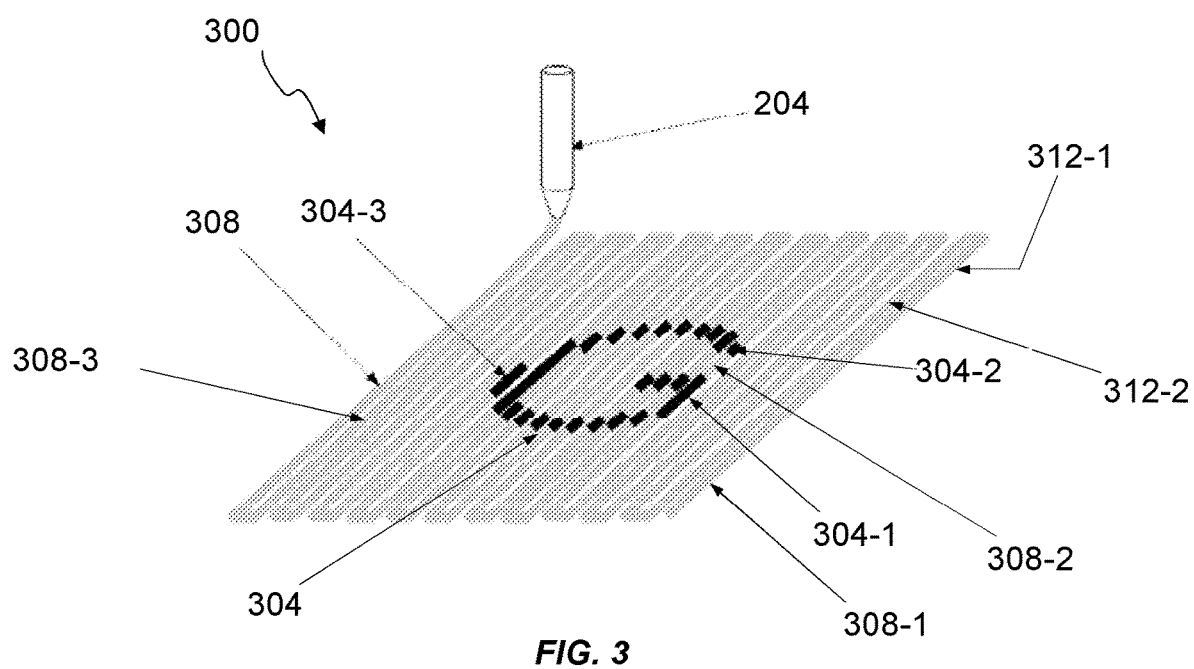
FIG. 3 is a perspective view illustrating a pattern of printing with a fused filament fabrication (FFF) printer using a thermoplastic filament such as shown in FIG. 1.

One such pattern for printing filament 224 is illustrated in FIG. 3 and is indicated generally as 300 which forms a "G" shape of one darker color, indicated as 304, in the background, indicated as 308, of a different lighter color. As illustrated in FIG. 3, printing nozzle 204 is shown to be moving in a continuous sinuous "snake-like" back and forth pattern which lays down lengths of extruded filament material, two adjacent lengths being indicated as 312-1 and 312-2. Background 308 is initially formed from a relatively long segment of lighter color material, indicated as 308-1. The "G" shape 304 is initially formed from several shorter segments of darker colored material, two of which are indicated as 304-1 and 304-2, with a lighter colored segment, indicated as 308-2, printed therebetween, i.e., the darker colored segments 304 alternate with the lighter colored segments 308. The last segment of darker colored material, indicated as 304-3, is then followed by another longer segment of lighter colored material, indicated as 308-3. Different color patterning as illustrated by FIG. 3 may be used to form multi-colored three-dimensional (3D) printed articles which may provide decorated objects, elements of a design, ads, billboards, promotion materials, interactive posters, etc., including decorative coatings applied to the exterior of a printed article. Instead of different colored materials, segments 304 may comprise other materials, for example, materials which fluoresce to illuminate the "G" shape, while segments 308 forming the background comprise an opaque material.

In some embodiments of the method of the present invention, the fused filament fabrication (FFF) printer, such as printer 200 illustrated in FIG. 2, may be operated instead in what is hereafter referred to an "active printing with feedback control" mode. When operated in an "active printing with feedback control" mode, filament 224 may be provided with indicia (e.g., marks, bar codes, etc.) which identify the characteristics of the segments comprising filament 224, including, for example, segment composition, segment length (which may include the position of the ends of the segment), segment order, etc., as well as what type of article, device, component, object, structure, part, etc., which may be printed from filament 224, the operating conditions for printing nozzle 204 in terms of temperature, filament throughput rate, etc., the lay down pattern of printing nozzle 204, etc. When sensor 248 reads the indicia on filament 224, the identifying characteristics of filament 224 (e.g., composition, length, order, etc., of the segments comprising filament 224) conveyed by that indicia (which may simply represent a code, number, etc., readable by sensor 248 and recognizable by printer 200), printer 200, based upon what indicia is read by sensor 248, may then electronically transmit instructions to printing nozzle 204 (based upon a computer program file such as a computer assisted drawing (CAD) program file, stereolithographic (STL) file, etc., which has the electronic data which includes at least the composition, order, and length of each of the plurality of segments required for printing filament 224 linked to the indicia read by sensor 248) to control the operation of printing nozzle 204 in fused filament fabrication (FFF) printing of the article, device, component, object, structure, part, etc., identified by the indicia read by sensor 248.

For example, the article, device, component, object, structure, part, etc., may require a filament 224 which comprises alternating segments comprising two different compositions, such as two compositions comprising different colorants. From reading special marks on filament 224, sensor 248 then determines the relevant characteristic of filament 224, including the composition of the alternating segments, and then transmits that information, data, etc., to the computer controlling the operation of printing nozzle 204. Based on the information data, etc., convey by those marks on filament 224, printer 200 determines the positioning of the printing nozzle 204, including the pattern and the path that the printing nozzle 204 moves in both horizontal and vertical directions, the operating conditions of printing nozzle 204 in terms of temperature, filament throughput rate, etc. Similar to the "passive printing" mode, when operating in the "active printing with feedback control" mode, printing nozzle 204 moves along the predetermined path and pattern (e.g., as instructed by printer 200 based upon instructions from the relevant computer program file such as a computer assisted drawing (CAD) program file, stereolithographic (STL) file, etc.) to lay down a "road" of material to print the article, device, component, object, structure, part, etc.

Printing with Multiple Printing Nozzles

In some embodiments, the thermoplastic multi-segment filaments according to the present invention may be used in combination with other conventional thermoplastic filaments. In such instances, a fused fabrication filament (FFF) printer having two or more printing nozzles may be used. For example, in a fused fabrication filament (FFF) printer having two printing nozzles, one printing nozzle may be supplied with a conventional thermoplastic filament uniformly comprising one composition, while other printing nozzle may be supplied with an embodiment of a thermoplastic multi-segment filament according to the present invention. In one such embodiment, printing of a box with an RFID tag that identifies the contents of the box may require a thermoplastic multi-segment filament according to the present invention for FFF printing of the RFID tag, while the main body portion of the box may be FFF printed with a conventional thermoplastic filament comprising only a polymer matrix, such as a acrylonitrile butadiene styrene (ABS) polymer.

Fabrication of Thermoplastic Multi-Segment Filament

Embodiments of the thermoplastic multi-segment filament according to the present invention may be fabricated, manufactured, etc., by a variety of different methods, such as the following:

Assembly from Segments Obtained from Other Filaments.

In one embodiment, the design of the article, device, component, object, structure, part, etc., to be printed may be analyzed to determine the composition, length, order, etc., of the segments required. A plurality of segments having the appropriate composition, length, etc., may then be formed, each having a pair of spaced apart ends, by, for example, cutting, slicing severing, etc., such segments from two or more continuous filaments having the appropriate compositions in the corrects lengths, assembling the formed segments in the correct (specified) order, and then joining, connecting, fusing, splicing, etc., together by means of light, heating, ultrasonic energy, laser energy, microwave energy, etc., to form the thermoplastic multi-segment filament having a plurality of segments in the correct (specified) order for printing of the article, device, component, object, structure, part, etc. with a fused fabrication filament (FFF) printer. Alternatively, these segments arranged in the correct (specified) order may also be joined, connected, spliced, etc., together to form a continuous filament by using adhesive (glue), solvent, etc., to soften the segments at the ends thereof so that the ends of adjacent segments adhere to form a continuous length of filament.

In one embodiment of the method for fabricating thermoplastic multi-segment filament according to the present invention, a supply of a first thermoplastic filament and a supply of a second thermoplastic filament are provided, wherein the first thermoplastic filament has at least one feature which is different from the second thermoplastic filament (e.g., the first thermoplastic filament has a color different from the second thermoplastic filament). A first set of segments, each having a forward end and a trailing end spaced apart from the forward end, is formed form the first thermoplastic filament, while a second set of segments, each also having a forward end and a trailing end spaced apart from the forward end, is formed from the second thermoplastic filament by, for example, cutting, slicing severing, etc., such segments. Each segment of the first set of segments and each segment of the second set of segments is formed alternatively and sequentially such that each segment of the first set of segments is adjacent to a segment of the second set of segments. For each of the adjacent segments, the trailing end of one of the adjacent segments is the forward end of the other of the adjacent segments is aligned and while the ends are in contact, joined, connected, fused, spliced, etc., to by light, heating, ultrasonic energy, laser energy, microwave energy, etc., to form the thermoplastic multi-segment filament having a plurality of segments in the correct (specified) order. Alternatively, trailing and forward ends of the adjacent segments may also be joined, connected, spliced, etc., together to form a continuous filament by using adhesive (glue), solvent, etc., to soften the trailing and forward ends so that these trailing and forward ends of adjacent segments adhere to form the thermoplastic multi-segment filament.

In some embodiments, the segments of the thermoplastic multi-segment filament may be assembled prior to being supplied for fused fabrication filament (FFF) printing (i.e., the filaments are preformed), or the segments of the filament may be supplied and assembled during fused fabrication filament (FFF) printing (i.e., the filament is assembled in situ). In one embodiment of filaments which are assembled in situ, a device assembling the segments of the filament (hereafter referred to as "filament assembly device") may be used in conjunction with the fused filament fabrication (FFF) printer. For example, a computer program may analyze the structure of a previously printed article that may be comprised of several different materials. This analyzed structure may then be expressed as a computer assisted drawing (CAD) file, such as a stereolithography (STL) file. This STL file may then be converted into a series of commands (e.g., by using a programming language for numerical control, such as G-code) for the operation of the FFF printer to print the article, as well as a series of commands to the filament assembly device for how to assembly the segments of the filament in the correct (specified) order so that the FFF printer prints the article correctly.

Figure 4:
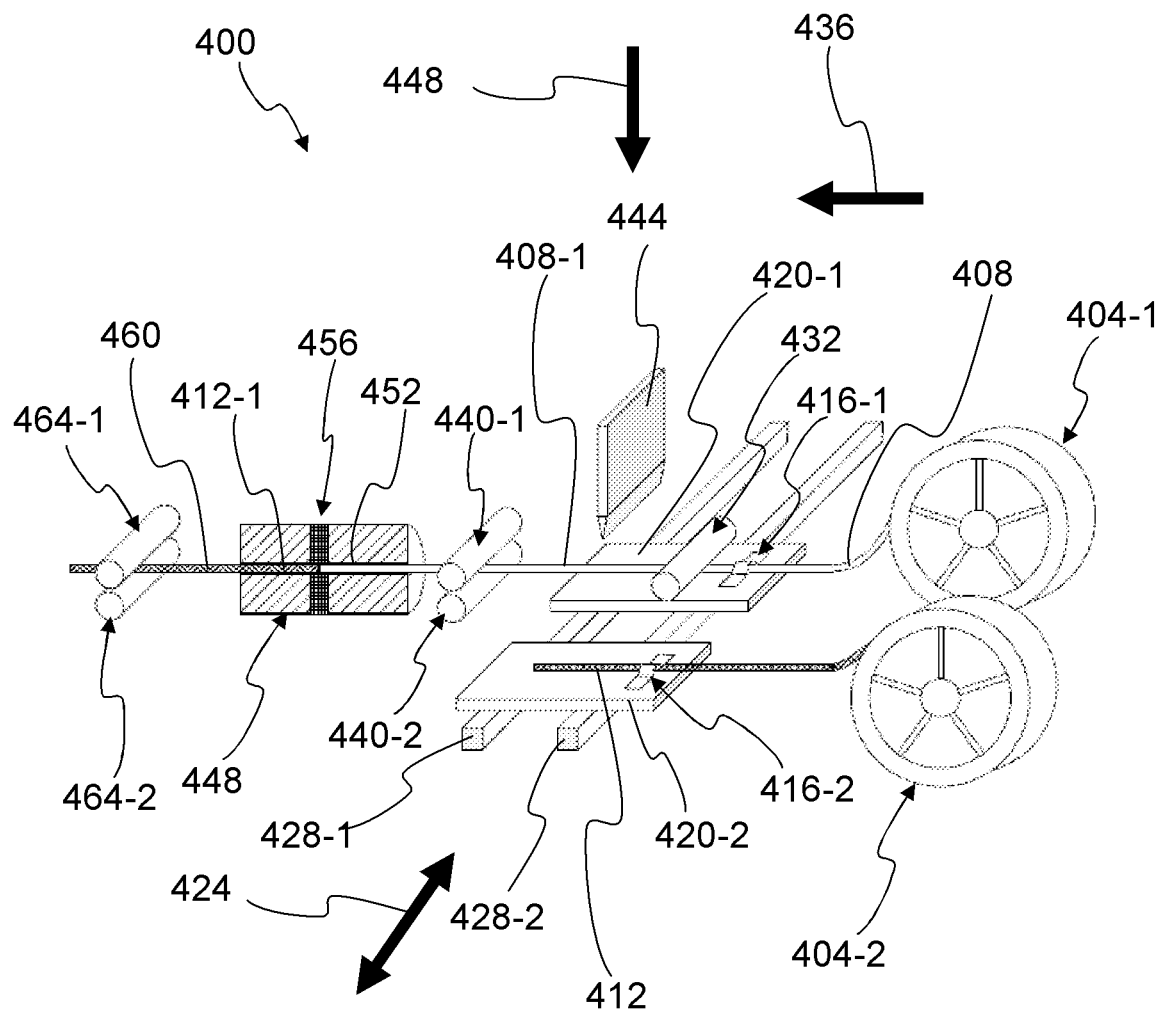
FIG. 4 is a schematic illustration of an embodiment of a filament fabrication device for fabricating a thermoplastic filament such as shown in FIG. 1.

An embodiment of a filament assembly device for fabricating thermoplastic multi-segment filaments according to the present invention which may be used to provide preformed filaments (such as such as filament 100 shown in FIG. 1), or which may be used to assemble filament segments in situ in conjunction with a fused fabrication filament (FFF) printer is schematically illustrated in FIG. 4, and indicated generally as 400. Device 400 includes a first filament supply component and a second filament supply component in the form of, for example, a first rotatable filament supply spool, indicated as 404-1 and a second rotatable filament supply spool, indicated as 404-2. Spool 404-1 supplies a first filament, indicated as 408, while spool 404-2 supplies a second filament, indicated as 412. Filaments 408 and 412 each have at least one feature which is different, for example, filament 408 comprises different materials from those present in filament 412, has a different color from filament 412, etc. As shown in FIG. 4, filament 408 is fed from spool 404-1 through first filament guide component, indicated generally as 414-1, having a first filament guide, indicated as 416-1 attached to, secured to mounted on, etc., a first plate, indicated as 420-1, while filament 412 is fed from spool 404-2 through a second filament guide component, indicated generally as 414-2, also having a second filament guide, indicated as 416-1 attached to, secured to, mounted on, etc., a separate second plate, indicated as 420-1. Plates 420-1 and 420-2 may be moved reciprocally from side-to side, in the directions indicated by double headed arrow 424, along a pair of spaced apart support rails, indicated as 428-1 and 428-2, thus allowing either filament 408 or filament 412 to be alternatively and sequentially positioned underneath a roller, indicated as 432. (Spools 404-1 and 404-2 also move side-to side in the directions indicated by double headed arrow 424 in synchronization, respectively, with the side-to-side movement of plates 420-1 and 420-2).

As shown in FIG. 4, filament 408 is currently positioned underneath roller 432. Roller 432 advances filament 408 in the direction indicated by arrow 436 towards a first pair of rollers, indicated as upper roller 440-1 and lower roller 440-2, the direction indicated by arrow 436 being the direction of advance of filament 408 which is substantially orthogonal to the direction(s) of reciprocal side-to side movement of plates 420-1 and 420-2 defined by double headed arrow 424. After a specified length of filament 408 has been advanced by roller 432, a filament cutter component in the form of, for example, a vertically reciprocating knife, indicated as 444, which is positioned between roller 432 (and thus also spools 404-1/404-2) and rollers 440-1/440-2, and which moves downwardly (i.e., moves substantially orthogonal relative to the direction of arrow 436 and substantially parallel to the direction(s) of double headed arrow 424) in the direction indicated by arrow 448 to cut (slice) filament 408, to thus form a trailing end (not shown) in a filament segment, indicated as 408-1, from filament 408, and a forward end (not shown) in what will be the next filament segment formed from filament 408. After filament 408 is sliced by cutting knife 440 to form the trailing end of filament segment 408-1, plate 420-1 may be moved sideways out from underneath roller 432, with plate 420-2 then being moved sideways underneath roller 432 in sequence so that filament 412 may be advanced by roller 432 toward rollers 440-1/440-2 and eventually cut into an appropriate length by reciprocating knife 444 to form the next filament segment from filament 412. In other words, the filament segments (such as filament segment 408-1) are formed (i.e., by cutting with reciprocating knife 444) alternatively and sequentially so that each filament segment formed from filament 408 is adjacent to a filament segment formed from filament 412.

As shown in FIG. 4, rollers 440-1/440-2 advance filament 408 (in the direction indicated by arrow 436) towards a filament segment joining section (shown in sectional view), indicated generally as 448, having a central horizontally extending generally cylindrically-shaped chamber, indicated as 452, for guiding filament 408 therethrough, and aligning the forward end of filament segment 408-1 with the trailing end of a prior segment cut filament segment formed from filament 412, indicated as 412-1. While the forward end of filament segment 408-1, and the trailing end of a filament segment 412-1 are aligned and in contact, a heater element, indicated as 456, heats the forward end of filament segment 408-1 and the trailing end of filament segment 412-1 so as to join, splice, connect, fuse, etc., these two ends together to form a continuous multi-segment filament, indicated as 460. Multi-segment filament 460 may then be advanced by a second pair of rollers, indicated as upper roller 464-1 and lower roller 464-2 to either a take up spool (not shown), or directly to the fused filament fabrication (FFF) printer. (The rotational speed of rollers 440-1/440-2 and rollers 464-1/464-2 is synchronized to avoid pulling apart the joined, spliced, connected, fused, etc., the forward end of filament 408 and the trailing end of segment 412-1.) Device 400 may also be controlled by a computer program to carry out the various operations of device 400, as previously described. In addition, while device 400 shows forming multi-segment filament 460 from two thermoplastic filaments (i.e., 408 and 412), device 400 may be altered by appropriate modification by those skilled in the art to accommodate forming multi-segment filament 460 from more than two thermoplastic filaments.

Continuous Production by Extrusion.

In another embodiment, thermoplastic multi-segment filaments according to the present invention may be fabricated, manufactured, etc., by extrusion. The process of extruding the thermoplastic multi-segment filaments may be continuous, wherein different materials may be loaded into, supplied to, etc., an extruder at different times during the extrusion process to form adjacent segments of the filament having at least one feature which is different, for example different materials compositions. Instead of loading or supplying different materials, various polymer additives may be loaded into/supplied to the extruder to modify the properties of the polymer. For example, these additives may be different colorants (e.g., pigments of various colors), graphene nanoplatelets, nanoplatelets of other two-dimensional (2D) materials such as molybdenum disulfide, boron nitride, carbon nanotubes, nanoparticles, etc. The materials may be supplied to the extruder in the appropriate order determined by the characteristics of the article, device, component, object, structure, part, etc., to be printed.

For precise and reliable fused filament fabrication (FFF) printing, embodiments of the thermoplastic multi-segment filaments may be fabricated, manufactured, etc., with indicia (e.g., one or more marks, bar codes, etc.) indicating the relevant characteristics, etc., such as segment composition, segment length (which may include the position of the ends of the segment), segment order, etc., wherein the fused filament fabrication (FFF) printer has a device (e.g., sensor 248) for reading and recognizing what information, data, etc., is conveyed by the indicia for controlling the operation of the fused filament fabrication (FFF) printer for that thermoplastic multi-segment filament, including the composition, order and length of the segments comprising the thermoplastic multi-segment filament being marked, optimal processing parameters, such as the deposition temperature and the filament throughput rate for advancing the filament, the pattern and path of movement of the printing nozzle, etc. Such indicia may be in the form of a marker which informs the printer of when each segment of the filament starts, such as segments having slightly different shapes, diameters, etc. Such markings may also be applied to the filament during the extrusion process. Alternatively, such marks may be applied, coated, painted, etc., onto the surface of the filament by using special coding, e.g., combinations of letters and numbers, bar codes, etc. In some embodiments, infusion of materials in the segments that provide an optical response to visible light, polarized light, UV, IR, other types of radiation, etc., may be used, including fluorescence detection.

Repeatable 3D Printing of Devices, Structures, Components, Parts.

In many cases, the same device, structure, component part, etc., may be used multiple times. For example, a circuit board may use a plurality of identical resistors and capacitors. Similarly, a power supply, battery etc., may be used in many different devices. Embodiments of the thermoplastic multi-segment filaments according to the present invention provide the ability to repeatedly print such devices, structures, components, parts, etc., with a fused filament fabrication (FFF) printer by preparing a plurality of such filaments having the required specified segments in the appropriate order.

Printing of Devices with Functional Elements Incorporated into a Polymer Matrix Body.

Fused filament fabrication (FFF) printing of thermoplastic multi-segment filaments according to the present invention may be combined with FFF printing of conventional filaments. For example, a device may be comprised of a body made of polymer matrix, with one or more functional elements, such as sensors, incorporated into that body. Each of the sensors may be comprised of two electrical leads and a strip of an environmentally sensitive material between the two leads, that environmentally sensitive material sensitive being able to change its electrical conductivity properties in response to changes in the sensor's environment, for example, changes in temperature, pressure, concentration of trace gases, etc. Such environmentally sensitive materials may include one or more of: metal oxides such as copper, manganese oxides, etc., which change electrical conductivity properties in response to temperature; graphene, such functionalized graphene, etc., which change electrical conductivity properties in response to being exposed to various gases, vapors, etc., etc. Manufacturing of these devices may be accomplished with a fused filament fabrication (FFF) printer having two printing nozzles, one supplied with the filament comprising a polymer matrix used to build the body of the device, the other printing nozzle being supplied with thermoplastic multi-segment filaments according to the present invention to print the sensors. Examples of sensors which may benefit from this method may include damage control sensors for wind turbine blades, capacitance "touch-sensitive" sensors, moisture and icing sensors, protein or other biosensors, etc.

Manufacturing Repeating Periodic Patterns in Articles.

Embodiments of thermoplastic multi-segment filaments according to the present invention may be used to manufacture article having repeating periodic patterns, e.g., a checkerboard pattern, articles printed by fused filament fabrication (FFF) printing. One advantage such thermoplastic multi-segment filaments may provide in printing such repeating periodic patterns is increased speeds and throughput rates for part manufacturing when compared to manufacturing the same pattern with three-dimensional (3D) printers equipped with multiple printing heads, each loaded with a certain material. These repeating periodic patterns may be, for example, a variety of meta-materials including nano-scaffolds, photonic crystals, optical gratings, materials with negative index of refraction, etc. In this method, the pieces of different materials may interchange with each other in a periodic manner.

Printing Heat Sinks for Thermal Management.

Heat sinks may be used to protect important elements from overheating, and often have complex shapes for seamless integration. In some cases, anisotropic heat transfer may be beneficial. In one embodiment, these thermoplastic multi-segment filaments may be used to form heat guides by combining materials with both higher and lower thermal conductivities, such as by creating a continuous extended structure comprising of a material having a higher thermal conductivity surrounded by another material having lower thermal conductivity such that excessive heat may pass along this structure. Such heat guides may be incorporated into the three-dimensional (3D) article directly by interchanging the materials of higher and lower thermal conductivity during the printing of the article. This application may target industries including, but not limited to, semiconductor equipment, housing for light sources, devices packaging, and equipment boxes.

Three-Dimensional (3D) Printed Batteries.

A battery may be comprised of the set of parts that include current collectors made of electrically conductive material, a cathode, an electrolyte (to provide ionic conductivity), and an anode. Each of these parts may require different materials. The materials for each of these parts may be formulated as thermoplastic composites. These thermoplastic composites may be formed into separate filaments which are cut into segments and spliced together (for example, by device 400 of FIG. 4) into a multi-segmented thermoplastic filament. By combining the filament segments the form each of the parts into a multi-segmented thermoplastic filament, a functional battery may be fabricated with such multi-segmented thermoplastic filament using a FFF printer equipped with a single printing nozzle.

Security Devices and Antennas.

Conductive traces may be used as antennas and RFID tags. Such tags may be embedded in the interior of the device and are not visible to the user.

RF, Anti-Static, and EMI Shielding.

Protection of sensitive equipment may be implemented if a conductive envelope is embedded in a 3D printed object.

Elements with Embedded Heaters.

Thermoplastic multi-segment filaments may be used provide embedded heaters. Examples of such applications may include heated car seats, deicers, heated tiles, walls or floor units with heaters, etc. Displays that change color with heating (e.g., thermocromes) may also benefit from using such thermoplastic multi-segment filaments in their fabrication.

Authenticity Marks.

Thermoplastic multi-segment filaments may have regions which may look identical, but which have special indicia (e.g., authenticity marks, signatures, etc.) which may be revealed, recognized, etc., if examined with specialized equipment (e.g., fluorescent scanners). For example, some regions or segments of thermoplastic multi-segment filaments may have fluorescent marks, isotope marks, etc.

Shock Absorbers, Materials with Anisotropic Mechanical Properties

Thermoplastic multi-segment filaments may suitable for fused fabrication filament (FFF) printing of wearable electronics, armor, (including personalized armor), helmets (including with embedded electronics), structures (e.g., cellular structures) used for protection from explosion, falling construction parts, earthquakes, etc.

Medical Applications.

With thermoplastic multi-segment filaments, one may fused fabrication filament (FFF) print scaffolds for the growth of different types of tissue, artificial bones and limbs, etc. With thermoplastic multi-segment filaments, anti-bacterial layers may be added by fused fabrication filament (FFF) printing to casts or implants.

Internal Wiring, Device Cases, Parts for Robots, Unmanned Vehicles

Embodiments of thermoplastic multi-segment filaments according to the present invention may be useful for a broad range of applications to embed internal wiring, sensors, light guides, etc., in a bulk part or a case, including, for example, in robotic devices, unmanned submarines, spacecraft, aircraft (e.g., unmanned aircraft such as drones, etc.), etc.

Radiation Protection.

Layers of material with high Z may be added around sensitive parts for radiation protection. Applications include vehicle protection, gas masks, vests, shielding of radiation-sensitive robotic parts.

Filaments with Gradually Changing Features.

The features of the thermoplastic multi-segment filaments according to the present invention may gradually change along the length of the filament.

Optical Lens.

The segments of the thermoplastic multi-segment filaments according to the present invention may be made of an optically transparent material, with the refraction index gradually increasing along the length of the filament. Such filaments may be used for manufacturing optical lenses. For example, the fused filament fabrication (printer) may be originally positioned over the center of the lens, and may then be moved along an outwardly the spiraling path to distribute the "road" of material.

This application may incorporate material which is subject to copyright protection. The copyright owner has no objection to the facsimile reproduction by anyone of this application or any portion of this disclosure, as it appears in the Patent and Trademark Office patent/patent application file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the scope of the present invention should not be limited by any of the above described exemplary embodiments.

In addition, it should also be understood that any figures in the drawings that highlight any functionality and/or advantages, are presented herein for illustrative purposes only. The disclosed architecture is sufficiently flexible and configurable, such that it may be utilized in ways other than those that may be shown. For example, the steps listed in any flowchart may be re-ordered or only optionally used in some embodiments.

Further, the purpose of the Abstract of the Disclosure in this application is to enable the U.S. Patent and Trademark Office, as well as the public generally, including any scientists, engineers and practitioners in the art who are not familiar with patent or other legal terms or phraseology, to determine quickly from a cursory inspection the nature and essence of the technical disclosure of the application. Accordingly, while the Abstract of the Disclosure may be used to provide enablement for the following claims, it is not intended to be limiting as to the scope of those claims in any way.

Finally, it is the applicants' intent that only claims that include the express language "means for" or "step for" be interpreted under 35 U.S.C. § 112, paragraph 6. Claims that do not expressly include the phrase "means for" or "step for" are not to be interpreted as being within the purview of 35 U.S.C. § 112, paragraph 6.

What is claimed is:

1. An article comprising a thermoplastic filament adapted for a fused filament fabrication (FFF) printer, the filament comprising:
a plurality of segments, each of the segments comprising a thermoplastic polymer; wherein for each pair of adjacent segments, one of the adjacent segments comprises a polymer matrix without functional materials being present, the other of the adjacent segments comprises a polymer with functional materials being present, the functional materials being one or more of electrically conductive materials or semiconductive materials;
wherein the plurality of segments are arranged in a specified order in the filament to provide a synchronized pattern of printing when the filament is printed with a fused filament fabrication (FFF) printer to form a three-dimensional structure comprising electronic circuitry formed from the functional materials.

2. The article of claim 1, wherein each pair of adjacent segments have differences in appearance which are one or more of differences in color, shape, opacity, transparency, translucency, or fluorescence.

3. The article of claim 2, wherein the at least one difference in appearance is as difference in color of each pair of adjacent segments.

4. The article of claim 1, wherein the adjacent segment without functional materials being present includes polymer matrix structural materials.

5. The article of claim 1, wherein the thermoplastic filament is provided with indicia which identify one or more of segment composition, segment length or segment order.

6. The article of claim 5, wherein the indicia identify the segment composition, segment length, and segment order of the thermoplastic filament.

7. The article of claim 6, wherein the indicia comprise one or more marks on the thermoplastic filament.

8. The article of claim 1, wherein the functional materials are one or more of graphene; functionalized graphene; graphene oxide; partially reduced graphene oxide; molybdenum disulfide; molybdenum diselenide; molybdenum ditelluride; tungsten disulfide; tungsten diselenide; hexagonal boron nitride; gallium sulfide; gallium selenide; lanthanum cuprate; bismuth tritelluride; bismuth triselenide; antimony triselenide; zinc oxide; niobium disulfide; niobium diselenide; tantalum disulfide; vanadium disulfide; rhenium disulfide; rhenium diselenide; titanium disulfide; titanium diselenide; indium trisulfide; zirconium disulfide; zirconium diselenide; or cadmium selenide.

9. The article of claim 1, wherein the functional materials are one or more of graphene nanoplatelets; inorganic nanotubes; molybdenum disulfide flakes; tungsten disulfides flakes; or boron nitride flakes.

10. The article of claim 1, wherein the polymer matrix structural materials comprise carbon fibers, and wherein the functional materials are other than carbon fibers.

11. The article of claim 1, wherein the thermoplastic polymer is one or more of acrylate polymers; methylmethacrylate polymers; copolymers of acrylate and methylmethacrylate; polylactic acid polymers; polyhydroxyalkanoate polymers; polycaprolactone polymers; polyglycolic acid polymers; acrylonitrile-butadiene-styrene polymers; polyvinylidene fluoride polymers; polyurethane polymers; polyolefin polymers; polyester polymers; polyalkylene oxide polymers; polyvinyl alcohol polymers; polyamide polymers; polycarbonate polymers; high impact polystyrene polymers; or polyurethane polymers.

12. The article of claim 11, wherein the thermoplastic polymer is one or more of: acrylonitrile-butadiene-styrene polymers; or polyethylene oxide (PEO) polymers.

13. The article of claim 11, wherein the thermoplastic polymer is water-soluble.

14. An article comprising a thermoplastic filament adapted for a fused filament fabrication (FFF) printer, the filament comprising:
a plurality of segments, each of the segments comprising a thermoplastic polymer which is one or more of acrylate polymers; methylmethacrylate polymers; copolymers of acrylate and methylmethacrylate; polylactic acid polymers; polyhydroxyalkanoate polymers; polycaprolactone polymers; polyglycolic acid polymers; acrylonitrile-butadiene-styrene polymers; polyvinylidene fluoride polymers; polyurethane polymers; polyolefin polymers; polyester polymers; polyalkylene oxide polymers; polyvinyl alcohol polymers; polyamide polymers; polycarbonate polymers; high impact polystyrene polymers; or polyurethane polymers;
wherein for each pair of adjacent segments, one of the adjacent segments comprises a polymer matrix without functional materials being present, and the other of the adjacent segments comprises a polymer matrix with functional materials being present, the functional materials being one or more electrically conductive or semiconductive graphene materials;
wherein the plurality of segments are arranged in a specified order in the filament to provide a synchronized pattern of printing when the filament is printed with a fused filament fabrication (FFF) printer to form a three-dimensional device comprising electronic circuitry formed from the electrically conductive or semiconductive materials materials.

15. The article of claim 14, wherein the electrically conductive or semiconductive materials materials are one or more of graphene; functionalized graphene; graphene oxide; partially reduced graphene oxide; graphite flakes; molybdenum disulfide; molybdenum diselenide; molybdenum ditelluride; tungsten disulfide; tungsten diselenide; hexagonal boron nitride; gallium sulfide; gallium selenide; lanthanum cuprate; bismuth tritelluride; bismuth triselenide; antimony triselenide; zinc oxide; niobium disulfide; niobium diselenide; tantalum disulfide; vanadium disulfide; rhenium disulfide; rhenium diselenide; titanium disulfide; titanium diselenide; indium trisulfide; zirconium disulfide; zirconium diselenide; or cadmium selenide.

16. The article of claim 14, wherein the electrically conductive or semiconductive materials materials are one or more of graphene nanoplatelets; carbon nanotubes; inorganic nanotubes; molybdenum disulfide flakes; tungsten disulfides flakes; boron nitride flakes; carbon black; or fullerenes.

17. The article of claim 14, wherein the electrically conductive or semiconductive materials materials are one or more of graphene nanoplatelets; inorganic nanotubes; molybdenum disulfide flakes; tungsten disulfides flakes; or boron nitride flakes.

18. The article of claim 14, wherein each pair of adjacent segments have differences in appearance which are one or more of differences in color, shape, opacity, transparency, translucency, or fluorescence.

19. The article of claim 18, wherein the at least one difference in appearance is as difference in color of each pair of adjacent segments.

20. The article of claim 14, wherein the adjacent segment without functional materials being present includes polymer matrix structural materials.

21. The article of claim 20, wherein the polymer matrix structural materials comprise carbon fibers, and wherein the functional materials are other than carbon fibers.

22. The article of claim 14, wherein the thermoplastic filament is provided with indicia which identify one or more of segment composition, segment length or segment order.

23. The article of claim 22, wherein the indicia identify the segment composition, segment length, and segment order of the thermoplastic filament.

24. The article of claim 23, wherein the indicia comprise one or more marks on the thermoplastic filament.

25. The article of claim 14, wherein the thermoplastic polymer is one or more of acrylonitrile-butadiene-styrene polymers or polyethylene oxide (PEO) polymers.

26. The article of claim 14, wherein the thermoplastic polymer is water-soluble.

* * * * *